May 6, 1958 N. CORDIS 2,833,394
DUAL-BELT ELEVATOR FOR POULTRY FEEDS
Filed Nov. 12, 1953 2 Sheets-Sheet 2
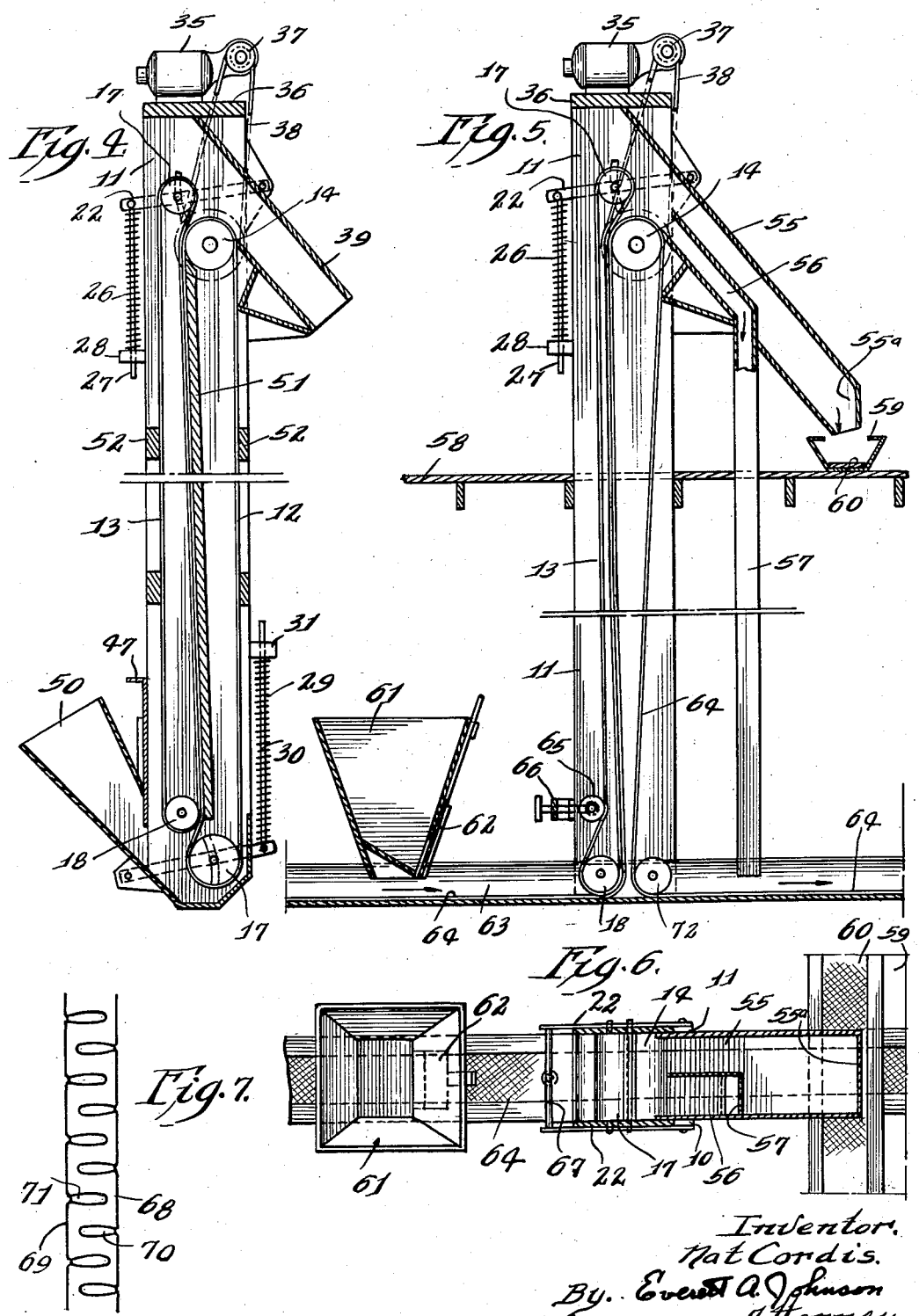
Inventor.
Nat Cordis.
By. Everett A. Johnson
Attorney.

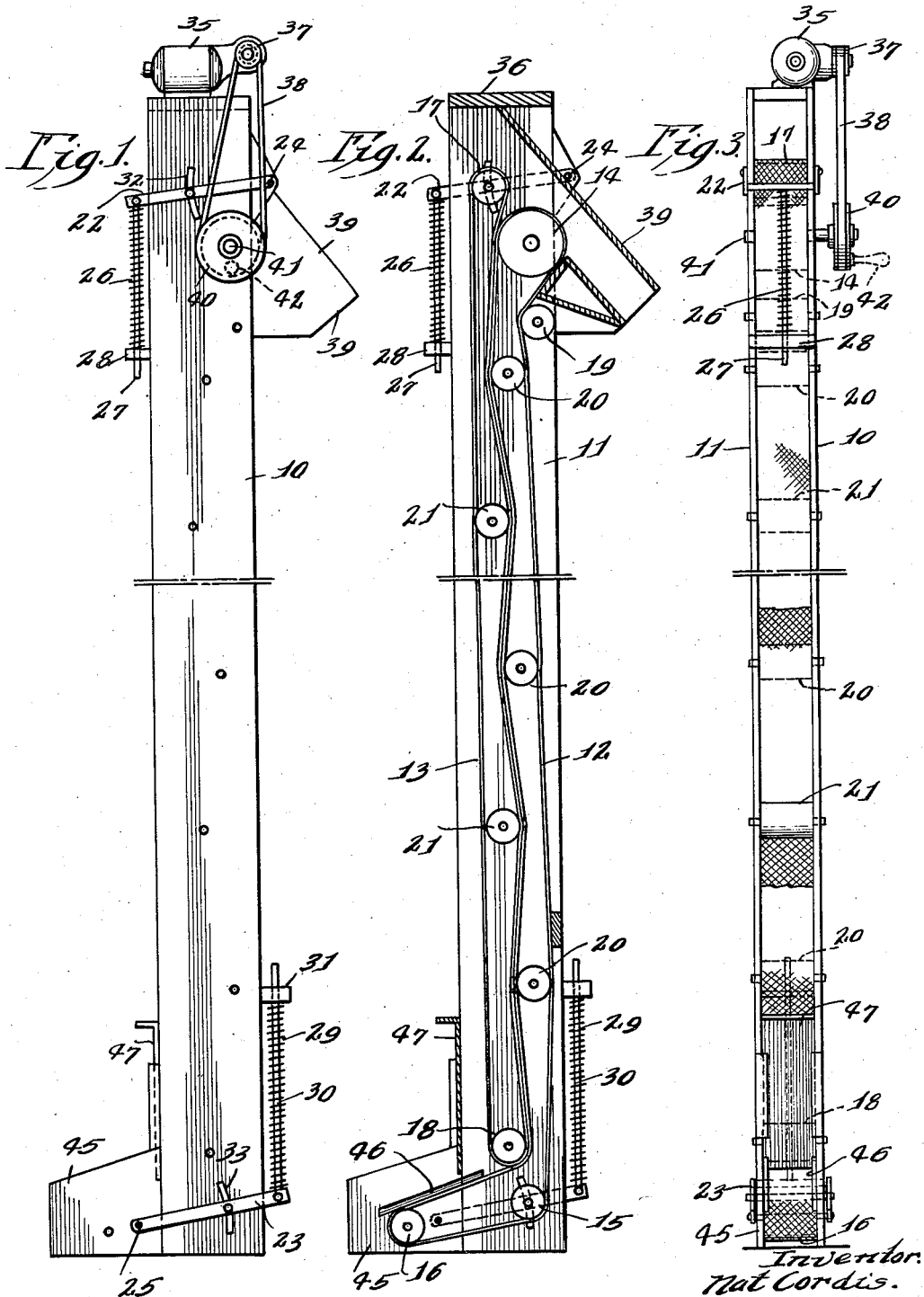

United States Patent Office 2,833,394
Patented May 6, 1958

2,833,394
DUAL-BELT ELEVATOR FOR POULTRY FEEDS
Nat Cordis, Silver Lake, Wis.

Application November 12, 1953, Serial No. 391,495

6 Claims. (Cl. 198—165)

This invention relates to the elevating of loose bulk materials such as granular and powdered solids, for example, chicken and cattle feed, and to loose materials in general which require elevating. More specifically, this invention relates to elevators for use in broiler batteries having two and three decks, wherein on each deck is a mechanical trough feeder.

Heretofore, mass flow conveyors have been proposed wherein the material being elevated is supported by the material in the lower part of the conveyor so that the conveying action depends upon the continuous flow of the entire mass being conveyed. It is a principal object of my invention to provide a novel method and means for elevating such bulk materials by means of opposed belts wherein the conveying action of the elevator does not depend upon the continuous flow of the entire mass of finely divided solids being handled. It is a further important object of the present invention to provide an elevator which is of simple construction, which is fool-proof in its operation, and which may be integrated with automatic chicken feeder installations. These and other objects of the invention will become apparent as the description thereof proceeds.

Briefly, I attain the objects of my invention by providing a pair of belts running upward within a frame member having side plates which enclose only the confronting belts at their edges within the conveying flight. The pair of belts is continuously fed with loose material at the lower end in a manner to urge the material between the moving belts which transfer the loose material upwardly and continuously discharge it at an elevated point. A horizontal portion of the driven belt extends beneath a feeding chute or into a bin. A series of rollers may be journaled between the plates and the confronting belts and are thereby caused to travel in a non-linear path from bottom to top within the frame.

The invention will be described in greater detail by reference to embodiments thereof illustrated in the drawings wherein:

Figure 1 is an elevation showing the exterior of an elevator;

Figure 2 is an elevation with one of the two side frame walls removed to show the relation of the rollers and belts;

Figure 3 is a front elevation of the elevator of Figure 1 with the belts partly removed;

Figure 4 is an elevation with the near frame member removed showing another embodiment of the elevator;

Figure 5 is an elevation, partly in section, illustrating another embodiment of the invention integrated with a feeding system;

Figure 6 is a top plan of the apparatus in Figure 5; and

Figure 7 is a detail of an embodiment of confronting belt structure.

Referring to the drawings, the feeder comprises a frame including parallel side plates 10 and 11 which are spaced by two arrays of pulleys 14—15—16 and 17—18.

A pair of endless belts 12 and 13 travel about the pulleys between the plates. Pulley 16 is laterally spaced with respect to roller 15 thereby providing a horizontal bed 46 onto which the granulated material is loaded. A leveler board 47 limits the amount of feed carried by the loading reach 46 which is fed between the idler belt 13 and the driven belt 12.

The belts 12 and 13 are trained about the respective groups of pulleys. Thus, belt 12 is the driving belt and passes about the pulley 16, laterally under pulley 18, upwardly between rollers 20 and 21, about drive pulley 14 which extends over the chute 39, and downwardly over guide roller 19, rollers 20, and under bottom idler roller 15. This latter roller is mounted on a shaft between arms 23, one end of which is pivoted at 25 to the frame plate 10. The shaft 15a is adjustable within the slot 33 to maintain the proper tautness in the belt 12. A rod 30, a compression spring 29 and the bracket 31 fixed to the frame position the shaft 15a and hence the pulley 15 with the proper slack in the belt 12.

The belt 13 is an idler belt and travels about bottom idler pulley 18, upwardly between rollers 20 and 21, and over top idler pulley 17. This latter pulley 17 is mounted between resiliently supported arms 22 on a shaft 17a which moves within slot 32 in the side plates 10 and 11. The spring 26, rod 27 and stop bracket 28 tend to lift the pulley 17 to keep the proper slack in the idler belt 13.

The drive pulley 14 may be rotated by hand, the exterior pulley 40 and handle 42 being provided for this purpose. However, a motor 35 mounted on top plate 36 and having pulley 37 can be provided to drive belt 38 and hence pulley 40 which is journaled on shaft 14a which supports the drive pulley 14 within and between the spaced plates 10 and 11. Upon rotation of the pulley 14 in a clockwise manner, the two confronting portions of the belts 12 and 13 between the sets of rollers 20 and 21 move upwardly carrying the feed between them. At the top of the elevator, the belts 12 and 13 are parted by pulleys 14 and 17, the feed traveling over the pulley 14 and falling therefrom into the chute 39. The speed of rotation will, of course, determine the rate of delivery of feed from the elevator.

Referring to Figure 4, the belts 12 and 13 pass about a first pair of pulleys 17 and 18 and a second pair of pulleys 14 and 15. A hopper 50 supplies feed to the confronting portions of the belts which travel upwardly adjacent baffle board 51. Blocks or strips 52 extend between the plates 10 and 11 and provide a means for guiding the nonworking flights of the belts. The upper pulley 17 and the lower pulley 15 are mounted resiliently in the same manner as described in connection with Figures 1, 2 and 3. The motor 35 drives the drive pulley 14 through the pulley 37 and belt 38. The feed travels over the pulley 14 and into the chute 39.

Another embodiment of the invention integrated with a continuous tape conveyor in a feed trough 63 is shown in Figures 5 and 6. A tape 64 is drawn through the trough 63 below the hopper 61. Feed is discharged onto the tape 64 by lifting the gate 62. The tape is threaded under pulley 18 in the elevator, carried upwardly over the pulley 14 and downwardly under pulley 72 in the trough 63. The usual idler belt 13 passes below pulley 18 under belt 64 and upwardly in contact with pulley 14 and about pulley 17. A take-up pulley 65, held by adjustable bracket 66, may be used to supplement the action of the spring 26 on arm 22 and hence pulley 17.

The feed carried upwardly between the confronting portions of the belts 13 and 64 is discharged into the dual chute 55 and 56. A portion of the elevated feed falls through chute 55 and outlet port 55a onto the belt 60 in the trough 59 on the second deck. Another portion of the elevated feed passes downwardly through delivery tube 57 onto the belt 64 in trough 63 for distribution along the lower deck trough.

It will also be understood that the elevator of Figures 2 or 4 may also be integrated with a pair of feed troughs on different levels. In such a case, the feed from the lower hopper or from the tape in the trough itself may be discharged completely or in part onto the loading reach 46 or into the chute 50 for delivery to the upper trough 59 on the second deck.

The belts 12, 13, 64 and 60 may be of the woven fabric webbing type. A particularly suitable webbing is about 1.5 inches in width and woven of mixed cotton and synthetic fibers to minimize stretching in use.

In Figure 7 the tapes 68 and 69 include "self"-ladder steps 70 and 71 formed by looping the fabric webbing and sewing or stitching across the width of the belt. These ladder steps co-act to hold feed between and above them as the belts 68 and 69 are in confronting relation when passing over the pulleys as described in connection with the belts 12 and 13.

Although my apparatus has been described in terms of particular embodiments thereof which have been described in considerable detail, it should be understood that this is by way of illustration only and that the invention is not limited thereto. Alternative constructions and operating techniques will become apparent to those skilled in the art in view of my disclosure. Accordingly, it is contemplated that such modifications do not depart from the spirit of the described invention or from the scope of the claims.

What I claim is:

1. A multiple level feeder for poultry and the like which comprises a feed hopper on a first level, first feed distributing means on said level, second feed distributing means on a second level, a first endless conveyor receiving feed from said feed hopper and conveying feed along said first distributing means. An elevator extending from said first level to a point above said second distributing means, said elevator including an upwardly extending flight of said endless conveyor confronting a second endless conveyor extending between the two levels, and chute means extending downwardly from above said second level and discharging onto said first feed distributing means, said elevator discharging from between said confronting endless conveyor and said flight into said chute means and onto said second feed distributing means on said second level.

2. The multiple level feeder of claim 1 wherein said elevator comprises a first endless belt having a feed-receiving reach and an elevating flight, a cooperating second endless belt having an elevating flight substantially confronting the elevating flight of the first-mentioned belt when the elevator is empty, spaced idler rollers positioned alternately on opposite sides of said elevating flights, idler pulley means guiding each of said endless belts, at least one idler pulley associated with each of said belts being resiliently mounted, and pulley means for driving said first endless belt.

3. An elevator and distribution system for chicken feed which comprises a frame including a pair of spaced elongated side plates, a pair of confronting belts adapted to travel about pulleys between said plates, said belts being substantially the width of the space between said side plates, an adjustable pulley in the lower part of said elevator over which one of said belts passes, a second adjustable pulley in an upper portion of said frame over which the other of said belts travels, the means for feeding loose bulk material between said belts at the lower end of the frame comprising a horizontal reach of one of said belts, and chute means at the end of the frame adjacent said second pulley for discharging elevated material from the elevator onto a feed distributing trough.

4. An elevator for fluent solid materials comprising a frame including a pair of spaced parallel plates, said plates being elongated with respect to their width, a first pair of pulleys spaced from each other and extending between said plates, a second pair of pulleys likewise spaced from each other and extending between said plates, the upper of said pair of pulleys comprising the drive pulley of the elevator, first and second belts each arranged about one of said pairs of pulleys, said belts having a width corresponding substantially to the distance between said spaced plates, one of said pulleys in said second pair being disposed below the upper pulley of said first pair and the second pulley of said second pair being disposed below and laterally spaced from said lower pulley of said first pair thereby providing a loading flight for said second belt, and electrical motor means carried by said frame for driving the upper drive pulley of said second pair whereby the second belt is caused to travel about the drive pulley, the lower pulley of the first pair, and the lower pulley of the second pair, and the idler belt is caused to travel upwardly in contact with said second belt about said first pair of pulleys and the upper pulley of said second pair.

5. In a chicken feed elevator, a vertically elongated frame means, a first endless belt having a laterally extending feed-receiving reach and an elevating reach within said frame means, a cooperating second endless belt having an elevating reach substantially confronting the elevating reach of the said first belt, a first array of idler rollers supported in said frame means and over which said second belt travels, the bottom-most idler roller in said first array being disposed above said feed-receiving reach and adjacent the lower end of said confronting elevating reaches and the upper-most of said idler rollers in said first array being resiliently mounted with respect to the longitudinal axis of said frame means, a second array of rollers over which said first belt travels, said second array including a drive pulley mounted in said frame means below said top-most resiliently mounted idler roller in said first array and an idler roller resiliently mounted in said frame means below said bottom-most idler roller in said first array, and chute means supported by said frame means and having an inlet below the upper end of said confronting elevating reaches and adjacent said drive pulley.

6. The elevator of claim 5 which includes an electric motor drive means carried by the upper end of said frame means and arranged to drive said pulley.

References Cited in the file of this patent
UNITED STATES PATENTS

| | | |
|---|---|---|
| 224,843 | Perkins | Feb. 24, 1880 |
| 1,917,659 | Marshall | July 11, 1933 |
| 2,254,116 | Cooper et al. | Aug. 26, 1941 |